US010210758B2

(12) United States Patent
Hetz et al.

(10) Patent No.: US 10,210,758 B2
(45) Date of Patent: Feb. 19, 2019

(54) METHOD AND PARKING SYSTEM FOR SUPPORTED PARKING OF PLACEMENT VEHICLES

(71) Applicant: SIEMENS AKTIENGESELLSCHAFT, Munich (DE)

(72) Inventors: Julia Hetz, Munich (DE); Thomas Jell, Munich (DE); Parag Mogre, Munich (DE); Hauke Thomas Rapold, Leverkusen (DE); Marcus Zwick, Moosach (DE)

(73) Assignee: Siemens Aktiengesellschaft, Munich (DE)

( * ) Notice: Subject to any disclaimer, the term of this patent is extended or adjusted under 35 U.S.C. 154(b) by 4 days.

(21) Appl. No.: 15/556,377

(22) PCT Filed: Jan. 29, 2016

(86) PCT No.: PCT/EP2016/051936

§ 371 (c)(1),
(2) Date: Sep. 7, 2017

(87) PCT Pub. No.: WO2016/146295

PCT Pub. Date: Sep. 22, 2016

(65) Prior Publication Data

US 2018/0108255 A1 Apr. 19, 2018

(30) Foreign Application Priority Data

Mar. 19, 2015 (DE) ........................ 10 2015 204 973

(51) Int. Cl.

| | |
|---|---|
| ***B60Q 1/48*** | (2006.01) |
| ***G08G 1/14*** | (2006.01) |
| *G06Q 50/30* | (2012.01) |

(52) U.S. Cl.
CPC ............. *G08G 1/147* (2013.01); *G08G 1/141* (2013.01); *G08G 1/146* (2013.01); *G06Q 50/30* (2013.01)

(58) Field of Classification Search
CPC ........ G08G 1/147; G08G 1/141; G08G 1/146; G06Q 50/30
(Continued)

(56) References Cited

U.S. PATENT DOCUMENTS

| | | | |
|---|---|---|---|
| 6,282,488 B1 | 8/2001 | Castor et al. | |
| 2002/0099574 A1* | 7/2002 | Cahill .................... | G06Q 10/02 705/5 |

(Continued)

FOREIGN PATENT DOCUMENTS

| | | |
|---|---|---|
| DE | 102011101189 A1 | 11/2012 |
| DE | 102012215218 A1 | 6/2014 |

(Continued)

*Primary Examiner* — Tanmay Shah
(74) *Attorney, Agent, or Firm* — Laurence Greenberg; Werner Stemer; Ralph Locher

(57) ABSTRACT

A method supports parking of placement vehicles in a parking system of a parking lot having at least one parking system apparatus. A parking region of the parking lot is scanned by a parking region sensor of the parking system and, based on the sensor information, a free and/or an occupied parking space and/or a free and/or an occupied parking area is identified by the parking system apparatus. A parking system for a parking lot for supported parking of placement vehicles is provided. The parking system has at least one parking system apparatus with a parking region sensor for identifying a parking space and/or a parking area of a parking region of the parking lot.

16 Claims, 2 Drawing Sheets

(58) Field of Classification Search
USPC ........................................................ 340/932.2
See application file for complete search history.

(56) References Cited

U.S. PATENT DOCUMENTS

| | | | | |
|---|---|---|---|---|
| 2003/0074129 | A1 | 4/2003 | Curbow et al. | |
| 2012/0112929 | A1 | 5/2012 | Gupta et al. | |
| 2013/0265419 | A1 | 10/2013 | Bulan et al. | |
| 2014/0210646 | A1 | 7/2014 | Subramanya | |
| 2015/0124093 | A1 | 5/2015 | Wang et al. | |
| 2015/0346727 | A1* | 12/2015 | Ramanujam ....... | B62D 15/0285 701/23 |
| 2016/0042643 | A1* | 2/2016 | Hohenacker ............. | G08G 1/04 705/13 |
| 2016/0217510 | A1* | 7/2016 | Brown ............... | G06Q 30/0284 |
| 2017/0200367 | A1 | 7/2017 | Mielenz | |

FOREIGN PATENT DOCUMENTS

| | | | |
|---|---|---|---|
| DE | 102013004493 | A1 | 9/2014 |
| DE | 102014222226 | A1 | 5/2015 |
| DE | 102014211557 | A1 | 12/2015 |
| EP | 0883873 | B1 | 12/1999 |
| WO | 2014140109 | A1 | 9/2014 |

* cited by examiner

METHOD AND PARKING SYSTEM FOR SUPPORTED PARKING OF PLACEMENT VEHICLES

BACKGROUND OF THE INVENTION

Field of the Invention

The invention relates to a method for supported parking of vehicles to be parked for a parking system of a parking lot as well as to a parking system of a parking lot for supported parking of vehicles to be parked. The invention further relates to a computer program or a computer program product, a computing unit or a processing device as well as to a parking infrastructure for parking of vehicles to be parked in a facility for parked vehicles.

In urban districts in particular there is too little space or room for parking of motor vehicles, wherein the increasing number of motor vehicles means that free parking bays (also referred to as parking places or parking stands, the terminology used below in this regard will be a parking bay or a plurality of parking bays) or parking spaces in a limited and/or restricted parking zone and/or a parking zone with or without barriers or on a parking lot are becoming ever scarcer. Therefore parking bays or parking spaces providing on-street/off-street parking are valuable nowadays. Examples of such a parking lot or parking zone are e.g. parking bays or parking spaces in/on a street, on a comparatively large surface area in the open air, in a covered area, in a multi-story parking lot, in a parking garage above/below ground etc.

In/on a street, e.g. within a town in a zone with a parking management system, a driver parks his or her vehicle and buys a ticket, which is displayed in the vehicle and shows an allowed parking time. A purchase price of the ticket is calculated in accordance with different tariff models (e.g. per 15 minutes, per hour(s) and/or per day(s), if necessary depending on a time zone, a tariff zone etc., and so on). As a rule a driver of the motor vehicle is not allotted or allocated a parking bay or a parking space. The vehicle can be parked by the vehicle driver in a way that they deem correct and/or as they see fit.

The result as a rule here is always an inadequate use of valuable room for parking of parking space and in addition does not allow the vehicle driver to be charged on the basis of a parking bay or a parking space occupied. For a better understanding of the problem the reader is referred to FIGS. 1 and 2 of the drawing, which represent the prior art. As can be seen from the two diagrams of FIG. 1, in both cases an equal amount of parking space 10 or equal room for parking 10 is available. However, depending on how the motor vehicles 31, 33 park, it can be no longer possible to park a motor vehicle 32 in the space available.

When a conventional parking zone management system or a traditional parking model is employed, the driver of the motor vehicle 31 would pay the same in both cases. Here a situation represented by the diagram at the top of FIG. 1 represents an efficient use of the surface of the parking lot 10 or of the parking zone 10. However, in the situation shown at the bottom of FIG. 1, the driver of the motor vehicle has taken up significantly more of the parking surface than would have been expected for a typical motor vehicle 31 or such a motor vehicle 31, whereby the parking lot 10 or the parking zone 10 is fragmented such that their use of the area is inadequate (inefficient use of space). This problem can naturally also be caused by more than just one motor vehicle 31.

A conventional solution to this problem lies, as is shown in the drawing in FIG. 2, in using lines 11 applied to the ground, so-called parking bay markings 11, in order to indicate parking bays 12 on a parking lot 10 or in a parking zone 10. Although these help a vehicle driver to orient themselves, they are however less suited to the efficient use of a parking zone 10 or parking lot 10. Also parking lot markings 11 do not support charging for the parking bays 12 of a parking zone 10 or parking lot 10 already used, cf. FIG. 2, which represents a similar situation to that shown in the bottom diagram of FIG. 1, despite parking bay markings 11.

In the light of the fact that a parking zone or a parking lot is valuable, the parking zone or the parking lot should be used as effectively as possible. This enables a higher yield to be obtained and at the same time enables traffic problems to be reduced, which are caused by motor vehicles looking for parking gaps, i.e. for parking bays or parking spaces within the parking zone or on the parking lot. The problem with the above traffic disruptions is also that they cause and magnify traffic disruptions in their turn and, like the above traffic disruptions, contribute to air pollution in towns and their centers.

SUMMARY OF THE INVENTION

An object of the invention, for a facility for parked vehicles, especially for a parking zone or parking lot without barriers for motor vehicles, is to provide a method and a device through which and/or by means of which the parking zone or parking lot can be better utilized. Here a corresponding parking system for a parking infrastructure as well as a corresponding parking infrastructure is to be specified, wherein a parking infrastructure that already exists should be able to be retrofitted with the inventive parking system.

The object of the invention is achieved by a method for supporting parking of vehicles to be parked for a parking system of a parking lot; by means of a parking system for a parking lot for supported parking of vehicles to be parked, by a computer program or by means of a computer program product; by means of a computing unit or processing device; and by means of a parking infrastructure for parking vehicles to be parked in/on a facility for parked vehicles. Advantageous developments, additional features and/or advantages emerge from the dependent claims and/or from the description of the invention given below.

The aim of the present invention, in the situation explained at the outset, is to levy charges in accordance with a parking bay occupied by a motor vehicle or in accordance with a parking space actually occupied by a motor vehicle. This insures that the motor vehicle drivers either park effectively or pay an appropriate additional charge, should they decide to park less effectively than would be possible. The present invention also provides a solution for reserving a parking space in a parking zone or parking lot without barriers, in particular in/on a street.

In the inventive method the parking system of a parking zone or of a parking lot has at least one parking system apparatus, wherein through a parking region sensor of the parking system apparatus and/or of the parking system, a parking region of the parking zone or of the parking lot is scanned, and on the basis of the sensor information, a free and/or an occupied parking bay and/or a free and/or an occupied parking space is established or is sensed/detected by the parking system apparatus and/or by the parking system.

This means that the parking region will be analyzed by the parking system and/or the parking system apparatus and at least one free and/or at least one occupied parking bay and/or at least one free and/or at least one occupied parking space determined. Here the parking system apparatus on its own, the parking system or the parking system together with the parking system apparatus can establish or sense/detect the free and/or the occupied parking bays and/or the free and/or the occupied parking spaces.

The parking region is managed by the parking system or the parking system apparatus on the basis of this information, or a vehicle driver concerned of a vehicle to be parked is offered or given support during parking. A vehicle to be parked here is to be understood as a vehicle still to be parked, possibly a vehicle temporarily left or a vehicle to be parked, whereas a vehicle already left safe in terms of traffic (doors locked from the outside, gear engaged/automatic transmission set to N and/or parking brake actuated etc.) is referred to as a parked vehicle.

A parking bay here can be understood as a standardized surface area or dimension (e.g. the parking space width of 2.30 m standardized in multi-story parking lots) for a vehicle. A parking space can be understood as an actual surface needed for a vehicle (vehicle to be parked, parked vehicle), if necessary taking into account a surface area for getting into/getting out of the vehicle, loading/unloading it and/or maneuvering the vehicle to be parked. The establishment of parking spaces as a rule delivers better results than the establishment of parking bays, since the first method can react more favorably to the dimensions of the vehicles.

The method enables a size and a location of a free and/or of an occupied parking bay and/or a size and a location of a free and/or of an occupied parking space to be established, wherein the sizes and the locations of the free and/or of the occupied parking bays and/or preferably the sizes and the locations of the free and/or of the occupied parking spaces of the parking region are established by the parking system apparatus or the parking system. Also a size and/or a location of a vehicle to be parked, possibly parked temporarily in a current parking bay and/or in a current parking space, can be established by the parking system apparatus or the parking system.

Above and beyond this an alternate free parking bay and/or an alternate free parking space for the vehicle to be parked can be established by the parking system apparatus or the parking system if necessary and can be output to a driver of the vehicle to be parked. Here the alternate free parking bay and/or an alternate free parking space can belong to another parking region of the parking system or also to another parking system.

A free parking bay and/or a free parking space for a vehicle to be parked can be established and output by the parking system apparatus or the parking system. Such a free parking bay or such a free parking space can have been reserved beforehand. This can be done for example by the parking bay or the parking space being reserved in advance for a specific period of time and/or being reserved for a specific period of time, possibly with an unspecified period of overtime. The inventive method can run on an inventive parking system or runs on said system.

The inventive parking system has at least one parking system apparatus with a parking region sensor for establishing a parking bay and/or a parking space of a parking region of the parking lot. Here once again the parking system apparatus on its own, the parking system or the parking system together with the parking system apparatus, can establish and/or sense/detect the parking bay and/or the parking space, i.e. a free and/or an occupied parking bay and/or a free and/or an occupied parking space or a plurality thereof.

It is preferred that an individual parking region of the parking lot is assigned a single parking system apparatus, which has an individual parking region sensor or detector. If the parking lot possesses only a single parking region, then the parking lot is preferably able to be sensed or detected with a single parking region sensor. I.e. in such a case the parking region is assigned a single parking system apparatus with a single parking region sensor or detector. A single such parking region sensor or detector can comprise a plurality of individual sensors and/or detectors, possibly of different designs or possibly with different methods of operation etc.

It is naturally possible to employ a plurality of parking system apparatuses and/or a plurality of parking region sensors or detectors for each parking region. In particular it is possible to configure an overlapping zone between two adjoining parking regions which is able to be sensed or detected by a plurality of parking system apparatuses and/or a plurality of parking region sensors.

If necessary at least one free parking bay and/or at least one free parking space can be able to be established or can be established by the parking system apparatus or the parking system. Also a size and/or a location of a vehicle to be parked, possibly parked temporarily in a current parking bay or in a current parking space, can be able to be established or will be established by the parking system apparatus or the parking system.

Furthermore a size and/or a location of a parked vehicle possibly parked temporarily in a current parking bay or in a current parking space can be able to be established and/or will be established by the parking system apparatus or the parking system. Above and beyond this, an alternate parking bay and/or an alternate parking space for the possibly temporarily parked vehicle can be able to be established or can be established by the parking system apparatus or the parking system such that the parking bay and/or the parking space needs a comparatively small surface area in the parking region.

Preferably parking costs for the vehicle to be parked are able to be calculated by the parking system apparatus or the parking system. Here parking costs arising in the future for a reserved parking bay and/or a reserved parking space in which the vehicle to be parked is likely to be parked and/or is parked can be able to be calculated or can be calculated. Also current parking costs for the current parking bay and/or the current parking space can be able to be calculated or can be calculated, in which the vehicle to be parked is possibly temporarily parked. Furthermore alternate parking costs for the alternate parking bay and/or the alternate parking space, in which the vehicle to be parked is further able to be parked and/or can be parked, can be able to be calculated and/or can be calculated.

The parking costs here are able to be calculated on the basis of a tariff model or on the basis of different tariff models, e.g. per 15 minutes, per hour(s) and/or per day(s), possibly as a function of a time zone and/or a tariff zone etc. Here a surface area of the parking bay or of the parking space is included in particular, in which the vehicle to be parked is able to be parked or is temporarily parked, and a surface area of the alternate parking bay or of the alternate parking space is included in particular, in which the vehicle to be parked is able to be parked as an alternative.

The parking system apparatus can also be embodied such that the parking costs for the reserved parking bay and/or the reserved parking space are able to be output or will be output to a driver of the vehicle to be parked. Above and beyond this the current parking costs for the current parking bay and/or the current parking space can be able to be output and/or will be output. Furthermore a location of the alternate parking bay and/or of the alternate parking space can be able to be output and/or are output. In addition the alternate parking costs for the alternate parking bay and/or the alternate parking space can be able to be output or are output.

The parking system can have a plurality of parking system apparatuses for a plurality of parking regions, wherein each parking system apparatus has at least one parking region sensor. In one form of embodiment of the invention the parking region sensor can be provided in an elevated position in the parking system in relation to the vehicle to be parked. The parking system apparatus can also have an input/output apparatus, a transmit/receive apparatus and/or an electronic and/or an electromagnetic interface. Furthermore the parking system can comprise an output facility, an output device and/or a possibly virtual user interface for output of information.

Such information can be a reserved/alternate parking bay or a reserved/alternate parking space for example. The information can in particular be output acoustically and/or optically, wherein the latter can be done graphically for example, by symbols and/or by means of characters (coordinates, bay numbers etc.). Such information can also comprise corresponding parking costs (characters) and/or other information (character, symbol, e.g. for a parking bay reserved or already reserved in another way or for a parking space reserved or already reserved in another way).

The parking system can be embodied such that an inventive method and/or an inventive computer program are able to be executed by the parking system and/or an inventive method and/or an inventive computer program will be executed. The parking system can also be embodied such that the parking system has an inventive computer program, an inventive computer program product, an inventive computing unit and an inventive processing device.

An inventive computer program or an inventive computer program product has program code means that are embodied to carry out an inventive method when the program code means is executed on a computing unit or a processing device, and/or is stored on a computer-readable data medium. The invention is thus able to be implemented as a method and computer program, e.g. in an inventive computing unit or an inventive processing device.

This means that an inventive computer program product, e.g. a computer program on a data medium, comprises program code, which comprises program code means for carrying out or executing the inventive method. Here the computer program can be carried out on a (micro)processor or a computer and/or can be stored on a data medium or a digital storage medium. The computer program can also e.g. be able to be partly called up by means of a computer program, e.g. an App.

Such a machine-readable or computer-readable data medium or such a digital storage medium can be a hard disk, a ROM, EPROM, EEPROM or flash memory, a memory chip, a diskette, a CD-ROM, a DVD or a Blu-ray disk for example. The computer program can also be stored in the form of firmware. Here the computer program can interact with (open-loop control/closed-loop control) signals able to be made available or read out, e.g. information of a sensor, an evaluation unit and/or an actuator, in a programmable processor or computer device or a corresponding system such that a form of embodiment of the inventive method is able to be carried out or executed.

An inventive computing unit or an inventive processing device is embodied such that an inventive method is able to be carried out by the computing unit or by the processing device and will be carried out in the event of a driver wishing to park. An inventive computer program can also be able to be run on the computing unit or the processing device and can run in the event of a driver wishing to park. Furthermore the computing unit or the processing device can have an inventive computer program or inventive computer program product.

The inventive computing unit can be embodied for example as an arithmetic logic unit or as a subunit of the inventive processing device. The processing device is embodied for example as an electronic computing device or unit, for example as a processor, a computer, a control apparatus or a control device or as another apparatus/facility or as a device, which can naturally also carry out or execute other tasks.

The inventive parking infrastructure for parking of vehicles to be parked comprises a facility for parked vehicles, wherein an inventive method is able to be carried out and/or is carried out by the parking infrastructure, if necessary by at least one parking system of the parking infrastructure. Furthermore the parking infrastructure can have an inventive parking system. The parking infrastructure can be embodied as a facility for parked vehicles retrofitted with the parking system. The facility for parked vehicles can be or is designed together with the parking system as a parking infrastructure. The facility for parked vehicles can also be embodied as a parking area, a parking lot, a multi-story parking lot or a parking garage.

The invention is explained in greater detail below on the basis of exemplary embodiments of a variant, which refer to an enclosed schematic diagram. Elements, assemblies or components which possess an identical, univocal or analogous embodiment and/or function are provided with the same reference characters in the figure description, the list of reference characters and the claims and/or are identified in the drawing with the same reference character. Possible alternatives, static or kinematic reversals, combinations etc. to the explained exemplary embodiments of the invention, or individual modules, parts or sections thereof not shown in the drawing or not conclusive can be taken from the list of reference characters.

All explained features, also those of the list of reference characters, are applicable not only in the specified combination or in the specified combinations, but also in another combination or in other combinations or on their own. In particular it is possible, on the basis of the list of reference characters and of the features assigned thereto in the description of the invention, the description of the figures and/or the list of reference characters, to replace a feature or a plurality of features in the description of the invention and/or the description of the figures. This further enables a feature or a plurality of features to be set out, specified in greater detail and/or substituted in the claims.

DESCRIPTION OF THE INVENTION

Figure 1:
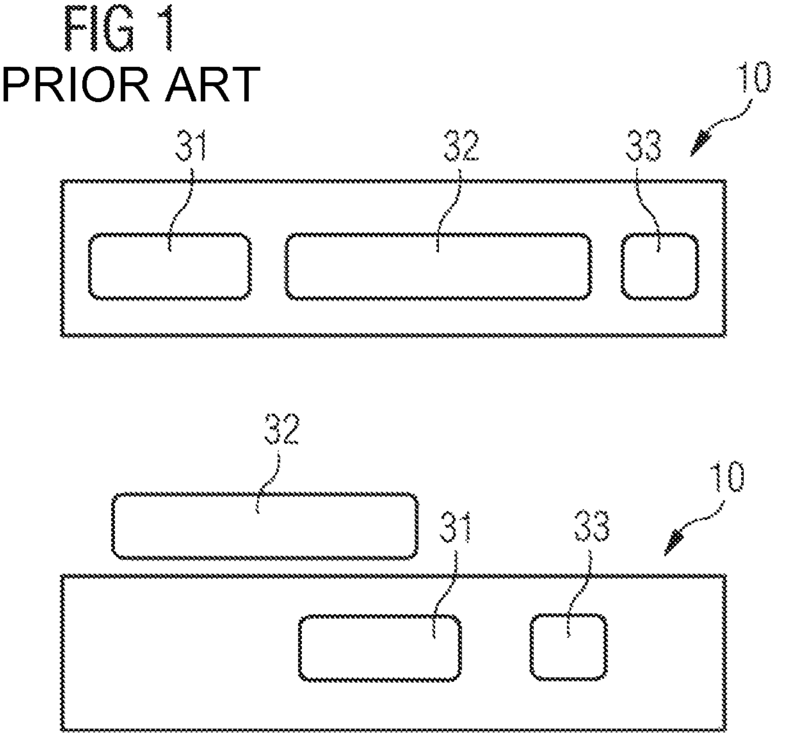
FIG 1 PRIOR ART
FIG. 1 shows a block diagram of a problem underlying the invention during conventional parking of a vehicle on a parking lot, especially in an urban district.
Figure 2:
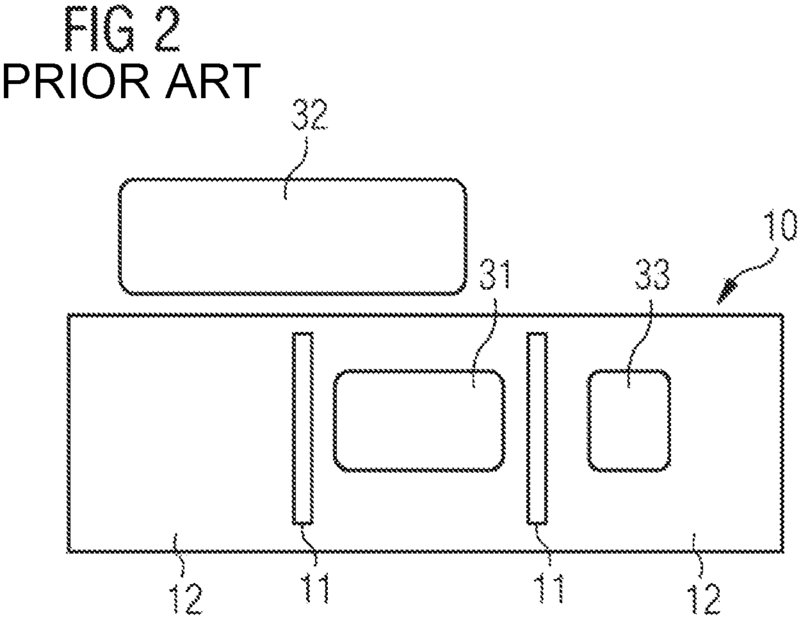
FIG 2 PRIOR ART
FIG. 2 shows a block diagram of an approach from the prior art to solving the problem underlying the invention by means of markings of the parking bays of the parking lot.

The invention is explained below in greater detail on the basis of exemplary embodiments of a form of embodiment of a variant of a method for supported parking of vehicles to be parked 31 of an inventive parking system 1 or of a parking management system 1 as well as an inventive parking system apparatus 2 or a sensor system apparatus 2 for a parking lot 10 for supported parking of vehicles to be parked 31. The term parking lot 10 is intended also to include the term parking zone 10 below.

The invention is not restricted to such a variant and/or to the explained exemplary embodiments, but is of a more fundamental nature, so that it can be applied to other methods, parking system apparatuses, parking systems, parking infrastructures in the sense of the invention. Although the invention is described and illustrated in detail by preferred exemplary embodiments, the invention is not restricted by these disclosed examples. Other variations can be derived herefrom without departing from the scope of protection of the invention.

To enable a parking region 14 of an existing parking lot 10 with parking bays 100 or parking spaces 100 for vehicles 30 to be used efficiently, the vehicles 30, in particular motor vehicles 30, should only occupy that surface area which they also really need for their basic surface area or for putting them into or taking them out of the parking space. To solve the problem described at the outset, the invention, see also FIGS. 3 and 4, proposes a parking system apparatus 2 for a parking system 1 for monitoring a parking region 14 of the parking lot 10, wherein the parking system apparatus 2 or the parking system 1 also allows more flexibility in a tariff model or tariff models and if necessary, above and beyond this, makes possible a provision of a reservation service on a restricted, delimited and/or enclosed or non-enclosed parking lot 10, e.g. in/on a street, for communities for example.

Figure 3:
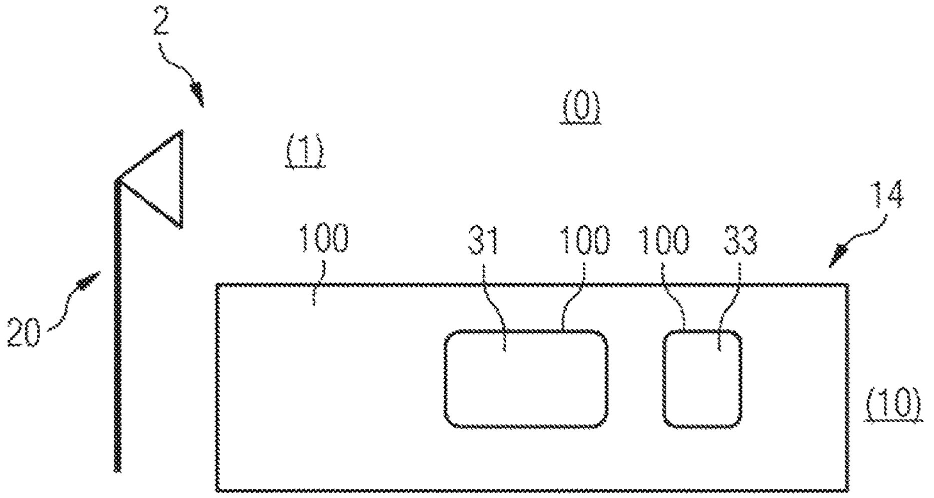
FIG. 3 shows a form of embodiment of the invention in a block diagram, on the basis of which an inventive parking system apparatus or an inventive parking system is explained in greater detail below.

In accordance with the invention the parking system apparatus 2 or the parking system 1 has a parking region sensor 20. For such a parking region sensor 20 or detector 20 sensors and/or detectors are relevant that can detect a shape (size; in particular a length, if necessary a width and/or if necessary a height; clearance) and a location of a motor vehicle 30, 31 in the parking region 14. Examples for such sensors or detectors are radar-based sensors or detectors or sensors or detectors with built-in video cameras or other sensor or detector systems which can make available information about the shape/size and/or the location of the motor vehicle 30, 31 in the parking region 14. This makes it possible to detect an inefficiently parked motor vehicle 31 and/or an inefficiently parked motor vehicle 33, as is shown in FIG. 3.

An efficient or a more efficient parking process is explained in greater detail below on the basis of FIG. 4. Here the motor vehicle 30 is located as a vehicle left standing in a parked position in the parking region 14 (cf. FIG. 4). This standing vehicle 30 can also represent a restriction 30 of the parking region 14 or of the parking lot 10. Also the motor vehicle 31 to be parked finally is already located in a possibly temporary parking position in the parking region 14. The location and the size/shape of the motor vehicle 31 will be detected by the parking region sensor 20.

Algorithms can now be applied, which for example establish, locally for each parking region 14 in the parking system apparatus 2, the surface area that the motor vehicle 31 effectively needs. Using the information about parked motor vehicles 30, a change of parking position of the motor vehicle 31 can be proposed. Also the algorithms can do the same globally in the parking system 1 as an alternative or in addition.

Figure 4:
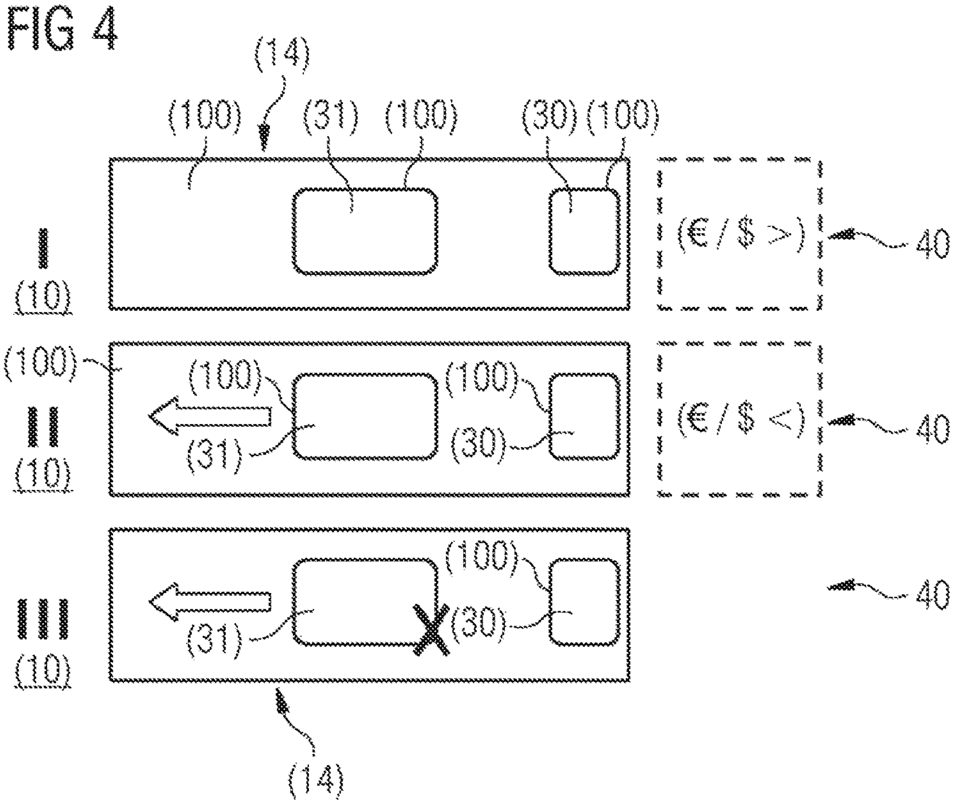
FIG. 4 shows three block diagrams (I-III) of an optical user interface, on the basis of which three scenarios for a vehicle to be parked on a parking region of a parking lot are explained in greater detail below.

This can be done with the aid of an, if necessary, virtual interface 40 shown in FIG. 4 (output/display facility, output/display device for output of information, if necessary with display, dialog box). Here the vehicle driver is requested, using the at least two suggested parking bays 100 or parking spaces 100, to select a parking bay 100 or a parking space 100 for their motor vehicle 31, for which they wish to purchase a parking ticket.

On the one hand these two parking bays 100 or parking spaces 100 (FIG. 4, I) are the temporary parking bay 100 or the temporary parking space 100 of the vehicle to be parked 31, which, in accordance with the choice of the motor vehicle driver, will become the final parking bay 100 or the final parking space 100; the parking charges for this are often comparatively high (FIG. 4, I: €/$>). And on the other hand (FIG. 4, II) the motor vehicle driver chooses the alternate parking bay 100 or the alternate parking space 100 for the vehicle to be parked 31; the parking charges for this are often comparatively low (FIG. 4, I: €/$<).

The purchase of the parking ticket can be an automated process. The motor vehicle 31 can be identified for example on the basis of a payment code, a vehicle code, information about a location of the vehicle 31 etc. In the time after the identification of the motor vehicle 31, on the basis of the results of the algorithms, different charges can be proposed, in order to improve the use of the parking region. See for example the case in FIG. 4, II, in which it is recommended that the motor vehicle 31 be moved to the alternate parking bay 100 or the alternate parking space 100 at lower costs (€/$<).

If a reservation service is to be made available, information about a vehicle code and/or a vehicle driver code can be used to detect whether the parked motor vehicle 31 has reserved this parking bay 100 or this parking space 100. If it has not done so, the vehicle driver can be requested to remove the motor vehicle 31 (as is shown for example in case III of FIG. 4). This makes a reservation of a parking bay 100 or a parking space 100 possible even in a parking region without barriers, e.g. on/in a street.

If the motor vehicle 31 is not identified up to the point of payment as the motor vehicle 30 for which a reservation is available, negotiations to make the reservation can be initiated. Such negotiations are relevant in particular when the parking bay 100 or the parking space 100 in question is suitable for a particular reason for another vehicle driver and was reserved in a back-end system (or in a local database of the parking region 14) for the motor vehicle 30 concerned. Reasons for this can be a good illumination of the parking bay 100 or of the parking space 100, a suitability as a parking lot for female drivers, an existing charging station for electrical energy, a suitability for wide and/or large vehicles 30, such as vans etc.

If the parking region 14 has an infrastructure for electronic communication, suitable means can be employed to give one or a plurality of vehicle drivers a view of the above information as soon as their motor vehicle 31 enters the parking region 14. This can also be done prior to this in time, if the communication range allows. The communication can take place via a parking App 40 for example, which has access to the information, recommendations etc. relating to the parking region 14 using GSM, GPRS, UMTS, another (mobile) radio network, an Internet access etc.

A local alternative would consist of making such the information available to an App 40 via a local server at an entrance to the parking region 14 using WLAN, Bluetooth or other suitable means for example. In addition it is possible for the aforementioned App 40 to be replaced by a website 40 or also to be able to be a user interface 40 in the motor vehicle 31 or at a ticket machine. It should be noted here that the user interface 40 does not have to be visual, but the information can also be output via a speech system or in another way. It is further possible for the parking region infrastructure to communicate directly with the motor vehicle 31.

The invention consists of a method and an apparatus or a system for making charges for each parking bay 100 or parking space 100 occupied in combination with recommendations and information that help vehicle drivers to use an available parking lot 10 effectively. The invention also opens up opportunities for more efficient reservation and enforcement of reservations of parking spaces 100 even in parking lots 10 without barriers. The description of the figures of the invention is explained in greater detail in conjunction with examples for a situation in a street area 10 without barriers. Naturally the invention can also be applied to a restricted, delimited and/or closed-off parking lot 10, e.g. for off street parking.

The invention claimed is:

1. A method for supported parking of vehicles to be parked in a parking system having at least one parking system apparatus for a parking lot, which comprises the steps of:
- scanning a parking region of the parking lot by a radar-based parking region sensor of the parking system apparatus;
- determining a free/occupied parking bay and/or a free/occupied parking space by the parking system apparatus or by the parking system on a basis of sensor information; and
- determining a size and a location of the free/occupied parking bay and/or a size or a location of the free/occupied parking space.

2. The method according to claim 1, which further comprises determining sizes and locations of free/occupied parking bays and/or sizes and locations of free/occupied parking spaces of the parking region by the parking system apparatus.

3. The method according to claim 1, which further comprising determining a size and a location of a vehicle to be parked in a current parking bay and/or in a current parking space by the parking system apparatus, and that an alternate free parking bay and/or an alternate free parking space for the vehicle to be parked is determined by the parking system apparatus or by the parking system and is output to a driver of the vehicle to be parked.

4. The method according to claim 1, which further comprises:
- determining a free parking bay and/or a free parking space for a vehicle to be parked by the parking system apparatus and is output; and/or
- running the method on the parking system.

5. A parking system for a parking lot for supported parking of vehicles to be parked, the parking system comprising:
- at least one parking system apparatus with a radar-based parking region sensor for determining a parking bay and/or a parking space of a parking region of the parking lot, wherein a size and a location of a vehicle to be parked in a current parking bay and/or in a current parking space, is able to be determined by said parking system apparatus.

6. The parking system according to claim 5, wherein a free parking bay and/or a free parking space for the vehicle to be parked is able to be determined by said parking system apparatus.

7. The parking system according to claim 5, wherein:
- a size and/or a location of the vehicle already left standing in the parking bay and/or in the parking space is able to be determined by said parking system apparatus; and/or
- an alternate parking bay and/or an alternate parking space for the vehicle to be parked possibly temporarily left standing is able to be determined such that the parking bay and/or the parking space needs a comparatively small surface area in the parking region.

8. A parking system for a parking lot for supported parking of vehicles to be parked, the parking system comprising:
- at least one parking system apparatus with a radar-based parking region sensor for determining a parking bay and/or a parking space of a parking region of the parking lot, wherein a size and a location of a vehicle to be parked in a current parking bay and/or in a current parking space, is able to be determined by said parking system apparatus; and
- parking costs for the vehicle to be parked are also calculated by said parking system apparatus.

9. The parking system according to claim 5, wherein said parking system apparatus:
- is able to output or will output parking costs for a reserved parking bay and/or for a reserved parking space;
- is able to output or will output current parking costs for a current parking bay and/or the current parking space;
- is able to output a location of an alternate parking bay and/or of an alternate parking space; and/or
- is able to output or will output alternate parking costs for the alternate parking bay and/or the alternate parking space to a driver of the vehicle to be parked.

10. The parking system according to claim 5, wherein said parking system apparatus is one of a plurality of parking system apparatuses for a plurality of parking regions, wherein each of said parking system apparatuses has said radar-based parking region sensor.

11. The parking system according to claim 10,
- wherein said radar-based parking region sensor is provided at a position in the parking system elevated in relation to the vehicle to be parked;
- wherein each of said parking system apparatuses further has an input/output device, a transmit/receive device and/or an electronic and/or an electromagnetic interface;
- further comprising an output facility, an output device, and/or a virtual interface for an output of information; and
- further comprising a processing device programmed to perform the method according to claim 1.

12. A non-transitory computer readable medium storing computer executable instructions which when executed on a processor perform a method for supported parking of vehicles to be parked in a parking system having at least one parking system apparatus for a parking lot, which comprises the steps of:

scanning a parking region of the parking lot by a radar-based parking region sensor of the parking system apparatus;

determining a free/occupied parking bay and/or a free/occupied parking space by the parking system apparatus or by the parking system on a basis of sensor information; and determining a size and a location of the free/occupied parking bay and/or a size or a location of the free/occupied parking space.

13. A parking infrastructure for parking of vehicles to be parked in/on a facility for parked vehicles, comprising:

at least one parking system processor programmed to:

scan a parking region of the facility for parked vehicles using a radar-based parking region sensor;

determine a free/occupied parking bay and/or a free/occupied parking space on a basis of sensor information; and determine a size and a location of the free/occupied parking bay and/or a size or a location of the free/occupied parking space.

14. The parking infrastructure according to claim 13, wherein:

the parking infrastructure is embodied as a facility for parked vehicles retrofitted with a parking system;

the parking infrastructure will be and/or is designed as a facility for parked vehicles together with the parking system; and/or the facility for parked vehicles is embodied as a parking zone, a parking lot, a multi-story parking lot or a parking garage.

15. The parking system according to claim 5, wherein:

parking costs arising in a future are able to be calculated for a reserved parking bay and/or a reserved parking space in which the vehicle to be parked is likely to be able to be parked; and/or current parking costs for a current parking bay and/or a current parking space, in which the vehicle to be parked are able to be calculated and/or alternate parking costs for an alternate parking bay and/or an alternate parking space, in which the vehicle to be parked is further able to be parked, are able to be calculated.

16. The method according to claim 1, wherein the method may be or is carried out in absence of geographic coordinates or in absence of pre-stored geographic coordinates.

* * * * *